United States Patent [19]

Young et al.

[11] 4,115,332

[45] Sep. 19, 1978

[54] WATER-ABSORBENT STARCH COPOLYMERIZATES

[75] Inventors: Austin H. Young; Frank Verbanac, both of Decatur, Ill.

[73] Assignee: A. E. Staley Manufacturing Company, Decatur, Ill.

[21] Appl. No.: 808,482

[22] Filed: Jun. 20, 1977

Related U.S. Application Data

[63] Continuation-in-part of Ser. No. 680,549, Apr. 27, 1976, Pat. No. 4,079,025.

[51] Int. Cl.$^2$ ............................................... C08L 3/00
[52] U.S. Cl. ........................... 260/17.4 GC; 260/17.3; 260/17.4 ST; 260/17.4 UC; 536/50; 536/111; 128/284; 128/285
[58] Field of Search ....... 260/17.3, 17.4 GC, 17.4 ST, 260/17.4 UC; 536/50, 111

[56] References Cited

U.S. PATENT DOCUMENTS

| 2,668,156 | 2/1954 | Caldwell et al. | 260/17.4 |
|---|---|---|---|
| 2,928,827 | 3/1960 | Paschall | 536/50 |
| 3,033,852 | 5/1962 | Paschall | 536/50 |
| 3,135,738 | 6/1964 | Cushing | 536/50 |

*Primary Examiner*—Edward M. Woodberry
*Attorney, Agent, or Firm*—M. Paul Hendrickson

[57] ABSTRACT

Water-absorbent, starch copolymerizates are prepared by copolymerizing an ethylenically unsaturated starch with other ethylenically unsaturated monomers which contain water-attractant groups or precursors of water-attractant groups. The water-absorbent starch copolymerizates may be easily prepared into the desired configuration for a particular end-use or combined with other substrates or carriers. The unpolymerized starch and monomers or precursors thereof may be applied or incorporated into a suitable carrier or substrate (e.g., cellulosic materials such as textiles, papers, etc.) and copolymerized in situ to provide a composite article of unitary construction with the water-absorbent starch copolymerizate permanently bonded or affixed thereto.

31 Claims, No Drawings

WATER-ABSORBENT STARCH COPOLYMERIZATES

BACKGROUND OF THE INVENTION

This application is a continuation-in-part of U.S. patent application Ser. No. 680,549 entitled "Copolymerized Starch Compositions" which was filed on Apr. 27, 1976 by Austin H. Young and Frank Verbanac.

Within recent years, certain derivatized starches capable of absorbing and retaining large amounts of water have been developed. These derivatized starches are frequently referred to as "water-absorbent starches". In U.S. Pat. Nos. 3,935,099 and 3,997,484 (both by Weaver et al.), starch polymers which reportedly absorb more than 1,000 times their own weight are disclosed. These water-absorbent starches are generally prepared by grafting polyacrylonitrile to starch molecules and then derivatizing the polyacrylonitrile chains to anions. The grafting is accomplished by free-radical catalysis (e.g., ceric or irradiation). The starch-grafting process is difficult to control and time consuming. The achievement of a critical grafting level is an essential prerequisite for a water-absorbent, end-product. A series of derivatization and neutralization steps are typically used to convert the nitrile group to anions and a water-absorbent starch product. This contaminates the product with salt. The water absorbency properties of these salt-contaminated starches are seriously impaired when they are used in aqueous solutions which contain trace amounts of salts and minerals. It is also difficult to achieve uniform and reproducible water-absorbency results. This apparently arises from difficulties in controlling the reaction. These water-absorbent starch compositions are also deficient in certain other properties which are essential and desirable for many end-usages (e.g., lack adhesiveness, prefabrication and shaping, film-forming, bonding, coating, etc. properties). This generally restricts their usage to limited areas of application (e.g., separately contained by a water-permeable enclosure or separately added or mixed to another substrate). In addition, these water-absorbent starches cannot be effectively used at high-solid coating levels or be readily affixed or bonded to a carrier or substrate or easily provided in a preformed shape.

U.S. Pat. No. 3,661,815 by Smith also discloses analogous water-absorbent starches which are prepared by saponifying starch-polyacrylonitrile graft derivatives with certain alkali metal bases. These water-absorbent starch grafts reportedly absorb more than 50 times their weight of water. The Smith process and products suffer from similar deficiencies as mentioned above with respect to Weaver et al.

The inventors desired to more easily and effectively prepare water-absorbent starch compositions under conditions which provide greater uniformity and end-product reproducibility. Greater tolerance and compatibility with aqueous solutions containing salt and mineral contaminants was also desired. Even more importantly, was the development of a water-absorbent starch which could be easily bonded or affixed to a substrate or preformed. Such a water-absorbent starch would considerably expand upon the versatility and usage of water-absorbent starches by the trade.

OBJECTS

An object of the invention is to provide a novel, simple and reproducible method for preparing water-absorbent starch compositions.

Another object is to obtain novel, water-absorbent starch compositions which in comparison to existing water-absorbent starches have improved versatility, utility and functional properties.

A still further objject is to provide a novel method for applying or affixing water-absorbent starches to carriers or substrates or preparing preformed products and the products thereof.

DESCRIPTION OF THE INVENTION

According to the present invention there is provided a water-absorbent starch copolymerizate which is capable of absorbing several times its own weight of water, said starch copolymerizate comprising the copolymerizate product of ethylenically unsaturated starch molecules and ethylenically unsaturated monomers with said ethylenically unsaturated monomers forming a connective polymeric linkage between said copolymerized starch molecules to provide a non-linear lattice of a plurality of starch chains linked together by polymeric linkages represented by the formula:

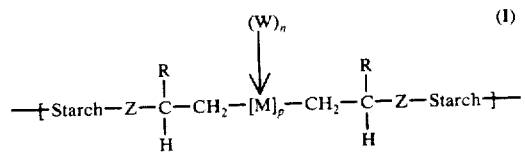

wherein Starch represents a starch chain of D-glucose units, Z represents an organo group which links the

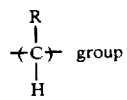 group to the carbon atom of the starch chain by a sulfur atom or an oxygen atom, R is a member selected from the group consisting of hydrogen and a monovalent organic radical, M represents a plurality of copolymerized ethylenically unsaturated monomers with "p" representing the number of copolymerized monomeric units in said linkage, (W) is q water attractive group or a hydrophilic moiety such as a member selected from the group of anion, cation, non-ion and amphoteric, zwitterion and amphiphilic moieties and mixtures thereof linked to the polymeric linkage and "n" represents the number of (W) moieties contained within the polymeric linkage of said copolymerized monomers.

The water-absorbent starches or their precursors may be prepared by a copolymerization process which comprises copolymerizing:

(a) starch chains containing appendant, terminal ethylenic unsaturated groups represented by the formula:

wherein Starch, Z and R are as defined above and "a" represents the degree of substitution of said terminal unsaturated groups on said starch chain, and (b) ethylenically unsaturated monomers represented by the formula:

$$M'+W')_{n'}$$

wherein M' represents an ethylenically unsaturated monomer, "(W')" represents at least one member selected from the group consisting of a water-attractant or a precursor thereof, and $n'$ is an integer to provide a cross-linked lattice of a plurality of starch chains linked together by polymeric linkages represented by the formula:

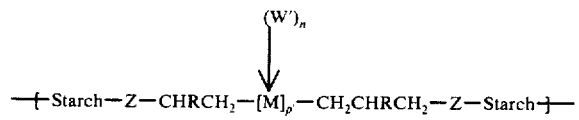

wherein the Starch, Z, R, (W') and $n$ are as defined above, M represents a plurality of copolymerized ethylenically unsaturated monomers which contain a sufficient number of (W) or (W') precursors within the polymeric linkage to impart water-absorbency to said copolymerized product, and "P" represents the number of copolymerized ethylenically unsaturated monomers between juxtapositional starch chains.

In the copolymerization process, a wide variety of M'—(W')$_{n'}$ monomers may be used to prepare the water-absorbent starch of this invention. The value of the $n'$ integer and the particular "W" or "W'" precursors which are used in the copolymerization process may vary considerably. Some of the monomers will contain "W" or "W'" precursors (e.g., $n'$ has a value of 1-3) while others may be free from the "W" or "W'" precursor moieties (e.g., $n'$ is 0). Similarly, the copolymerized monomers may be essentially comprised of monomers which contain the "W" or "W'" precursors. In the aforementioned formula, M' may be comprised of an ethylenically unsaturated portion of an organic group of the same chemical composition, or a mixture of different copolymerized monomers in which the M' group differs in composition. Likewise, the "W" or "W'" precursors may be of the same of different in type. The amount of "W" monomer or "W'" monomer precursors copolymerized with the starch is maintained at a level sufficient to impart water-absorbency to the copolymerized starch product. If "W'" precursors are solely used, then it is necessary to convert a sufficient number of precursors to the water-attractant form to achieve the desired water-absorbent, starch copolymerizate product.

In comparison to existing water-absorbent starches, the present starch copolymerizates are more versatile and useful. They may be prefabricated from water-soluble or water-dispersible, modified or hydrolyzed starches into high-molecular-weight and cross-linked, water-absorbent starch copolymerizates. In general, the ethylenically unsaturated starches used herein are most typically provided in a water-soluble form or may be easily converted to such a form. This renders the present invention particularly applicable to prefabricating operations wherein water or aqueous systems are used to disperse, dissolve or plasticize the starch. The invention therefore is ideally suited for most prefabricating operations (e.g., coating, molding, casting, extrusion, drying, sheeting, printing, bonding, encapsulating, gelling, impregnating, laminating, plasticizing, etc.) wherein the starch is initially provided in a form most suitable for prefabrication (e.g., liquid, pliable, moldable, etc.) and then preformed and converted into a solid object.

The starch portion of the ethylenically unsaturated starch chains may be derived from a variety of starch sources, including cereal, leguminous, tuber starches. Illustrative starches include tapioca, corn, high amylose, sweet potato, waxy maize, canna, arrowroot, wheat, sorghum, waxy sorghum, waxy rice, soya, rice, pea, amylose or amylopectin fractions, combinations thereof and the like. The starch amylose content affects the temperature at which a starch will convert to a water-dispersible or starch paste form. The high amylose starches typically require elevated temperatures and pressures (e.g., extrusion, jet cooking, etc.), for uniform disposal into aqueous systems. In contrast, starches of a lower amylose content (e.g., 30% amylose or less) are more easily dispersed or pasted in water (e.g., 50°-70° C.). Prepasted or pregelled starches of an amylose content of less than 30% normally disperse into water at an ambient temperature (e.g., 23° C.).

For many prefabricates, it is advantageous to modify or alter the starch chain to achieve a more functional and versatile starch product. This may be accomplished by derivatizing the starch chains, so that they contain other substituents (e.g., esters or ethers which may contain cationic, anionic, non-ionic, amphoteric, etc. groups). The ethylenically unsaturated starches may be provided in the pregelled or prepasted form or hydrolyzed (e.g., chemical or enzymatic hydrolysis of granular or non-granular ethylenically unsaturated starches) to improve upon their dispersibility into aqueous system. Ethylenically unsaturated dextrins, maltodextrins and other low viscosity imparting ethylenically unsaturated hydrolyzates (e.g., D.E. 0.2-30), are particularly well suited for coating applications. Such ethylenically unsaturated starch hydrolyzates provide a means for achieving a high-solids and low viscosity system which is particularly well suited for aqueous coating and prefabricating applications. Modification, derivatization or hydrolysis of such starches may be accomplished prior or after its derivatization to the ethylenically unsaturated form.

Ethylenically unsaturated starches which contain hydrophobic substituents may be used but will typically require a dispersant. Water-miscible, organo dispersants such as alkanols (e.g., methyl, ethyl, isopropyl, or butyl-alcohol), polyhydric alcohols (e.g., glycerol, ethylene glycol), ethers, (e.g., methyl, ethyl or propyl ethers, etc.), ketones (methyl ethyl ketone, ethyl ketone, etc.), as well as conventional anionic, non-ionic and cationic surface active agents or emulsifiers (e.g., see McCutcheon's Detergents and Emulsifiers—North American Edition—1975) may be used to facilitate their conversion to a more water-dispersible form.

It is usually advantageous to employ hydrophilic, ethylenically unsaturated starches which will uniformly disperse into water at temperatures above the starch gelation point without the aid of water-miscible organo dispersants or surfactant systems. Hydrophilic starches characterized as yielding a centrifugal starch residue of less than 25% (preferably less than 10%) upon immersion in water (one part ethylenically unsaturated starch/100 pbw water) for one hour at temperatures above their gelation point and centrifugation at $10^3$g's for 10 minutes are most suitably used to coating and prefabricating applications. Hydrophilic ethylenically unsaturated starches containing pendant ethylenically unsaturated groups with polar moieties or substituents to impart hydrophilicity to the unsaturated portion of the starch molecule (e.g., hydroxy, carboxy, amide, carbamyl, sulfoamyl, imido, sulfoamino, thio, thiolamino, oxy, thiocarbonyl, sulfonyl, carbonyl, sulfoamido, quaternary ammonium halides, the alkali or ammonium salts) are especially useful.

The water-dispersible, ethylenically unsaturated starches herein may be prepared by a variety of starch derivatization processes. Derivatization processes which may be used to produce appendant, monoethylenically unsaturated groups include reacting alkali metal starch or hydroxyethylated starch salts with an allyl propiolate to provide carboxylated vinyl starch ether; reacting starch with ethylenically unsaturated organic carboxylic anhydrides (e.g., methacrylic anhydride, etc.) or organic allyl halides (e.g., allyl bromides, allyl chloroformates, etc.) or epoxides (e.g., butadiene monoxides, etc.) to provide ethylenically unsaturated starch esters or ethers. The most suitablle monoethylenic unsaturated starches are the starch esters of alpha, beta ethylenically unsaturated carboxylic acids e.g., acrylate, methacrylate, crotonate, citraconate, itaconate starch esters as well as alkali salts and amides thereof, mixtures thereof and the like); N-allyl carbamate starch esters (e.g.,

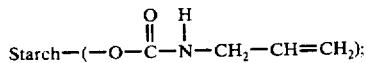
Starch—(—O—C—N—CH$_2$—CH=CH$_2$);

glycidyl methacrylate and glycidyl acrylate starch ethers (e.g., see U.S. Pat. No. 3,448,089); allyl starch ethers (e.g., allyl, iso-propenyl, etc.); the allyl alkyl starch ethers (e.g., ethyl, propyl, butyl, etc. starch ethers) and the allyl alkylene oxide starch ethers; allyloxyalkyl starch ethers (e.g., the allyl oxyethyl, oxypropyl and oxybutyl, etc., starch ethers); allyloxy hydroxyalkyl starch (e.g., 3-allyloxy-2-hydoxy-propyl starch, etc.); starch acrylamides, etc.; combinations thereof and the like.

In a more limited embodiment of the invention, the ethylenically unsaturated starches comprise those starches which will readily and uniformly copolymerize with the bridging comonomers. Ethylenically unsaturated starches which contain polar groups immediately juxtapositional to the unsaturated group and which activate the copolymerizability of the double bond in the presence of free-radical initiating systems are particularly well suited for this purpose. Such ethylenically unsaturated starches may be represented by Formula III:

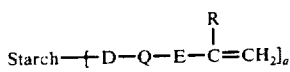  (III)

wherein starch is a starch chain of D-glucose units, E represents an activating polar group juxtapositional to the ethylenic unsaturation, D is sulfur or oxygen, Q is an organo group which divalently joins the D group to the activating polar group, R represents a monovalent group and "a" represents the D.S. (i.e., the number of appendant ethylenic unsaturated groups per anhydroglucose unit of said starch chain). Typical juxtapositional activating polar groups (i.e., E) include

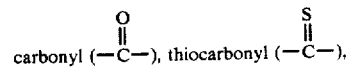

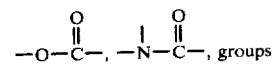

and the like. The ethylenically unsaturated portion of the starch chains are most typically comprised of appendant groups which individually have a molecular weight of less than 500 with those having an appendant molecular weight of greater than 50 but less than 300 (preferably from 75 to about 150 M.W.) being most typical.

In a more preferred embodiment of the invention, the E group contains a

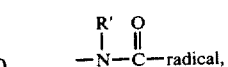

R' is a member selected from the group consisting of hydrogen and a mono-organo group which is joined directly to the nitrogen atom by a monovalent bond.

In Formula III, Q may be any divalent organo group which joins the activating radical to the starch chain (e.g., linked to D and acrylamide nitrogen atoms via carbon linkages). The starch oxygen or sulfur atom and activating radical may be directly linked together by a single carbon atom or by an organo group which is comprised of a plurality of carbon atoms. The —Q— group may be comprised of substituted or unsubstituted, straight or branched aliphatic groups (e.g., alkylene), substituted or unsubstituted, arylene group (e.g., naphthlene, phenylene, etc.) as well as divalent organo groups which contain carbon to non-carbon atom linkages (e.g., organo ethers and thioethers, sulfonyl, N-methylene substituted secondary and tertiary amines (such as a —CH$_2$—N(H)—Q— radical). If desired, the Q group-linking chain may also contain other substituents such as carbonyl, carboxylate, thiocarbonyl, etc. radicals as well as monovalent radicals such as hydroxy, halo (e.g., Br., F., Cl and I), alkyl, aryl, hydoxyalkyl, hydroxyaryl, alkoxy, aryloxy, carboxyalkyl, carboxyaryl, amine substituents, combinations thereof and the like. Advantageously the divalent Q organo group will contain less than 10 carbon atoms and preferably no more than 7 carbon atoms.

In Formula III wherein "E" is an activating group, the R' and R may be selected from the group consisting of mono-organo and hydrogen substituents. The R' and R mono-organo groups may also contain an ester, ether, carboxylic organo acid, alcohol, hydrocarbyl (e.g., alkyl, aryl, phenyl, etc.) as well as divalent organo groups containing non-carbon atoms to carbon chain linkages (e.g., such as oxy, sulfonyl, thio, carbonyl groups, etc. as mentioned above with respect to Q). Advantageously, R' and R are either H or a substituted or unsubstituted mono-organo group containing less than 8 carbon atoms such as a lower alkyl or phenyl group. Illustrative substituted mono-organo groups are halo substituted alkyl and phenyl, alkoxy, aryl, phenoxy, phenol and alkanol and correspondingly thiols, alkanoic, phenoic, tolyl, benzoyl, carboxy, sulfoalkyl, sulfo-phenyl, combinations thereof and the like. In the preferred embodiments of this invention, R' and R are a member selected from the group consisting of either hydrogen or a 1–5 carbon alkyl (preferably methyl) and "$a$" has a value of at least 0.002.

The most preferred ethylenically unsaturated starches are the starch acrylamides represented by Formula IV:

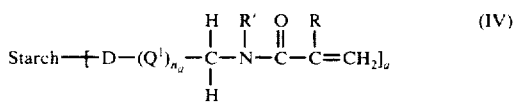

D is a member as defined above (preferably oxy), $Q^1$ represents a divalent organo group such as Q is defined above, "$a$" represents the degree of substitution, R and R' are monovalent groups as defined herein and "$n_a$" is a number of 0 or 1.

The aforementioned Formula IV starch acrylamides may be prepared by reacting N-methylol acrylamides with starch in the presence of an acid or acid generating catalyst and a polymerization inhibitor as illustrated by the following etherification equation V:

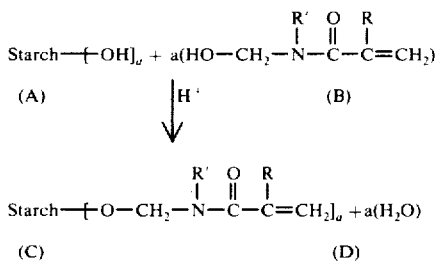

wherein "$a$" of reactants (A) and (B) represent the number of starch hydroxyl groups of (A) etherified with the N-methylol acrylamide reactants (B), R' and R are mono-organo or hydrogen groups such as defined below, and H$^+$ represents an acid or acid generating etherifying catalyst. The above N-methylol acrylamide reaction V may also be used to prepare a starch acrylamide reaction product (C) wherein Q as illustrated in Formula III contains an alkylene oxy or arylene oxy group by reacting the corresponding hydroxyaryl or hydroxyalkyl starch ethers (e.g., hydroxypropyl and hydroxyethyl starch ethers) with an N-methylol acrylamide wherein R' and R represent a monovalent group. Substituted acrylamides which contain a reactive N-methylol group linked to the acrylamide nitrogen atoms by intervening divalent Q organo groups and starches containing cationic and anionic or ionic acrylamide substituents may be obtained by etherifying a starch with the appropriate N-methylol acrylamide (e.g., sodium-2-N-methylol acrylamido-2-methylpropanesulfonate, a N-methylol acrylamide quaternary ammonium halide such as 3-(N-methylol acrylamido)-3-methyl butyl trimethyl ammonium chloride, etc.). Representative R' substituents in V above include hydrogen, N-arylol, the N-alkylamines and N-arylamines such as N-methylol-; N-ethyl-; N-isopropyl-; N-n-butyl-; N-isobutyl-; N-n-dodecyl-; N-n-octadecyl-; N-cyclohexyl-; N-phenyl-; N-(2-hydroxy-1,1-dimethylpropyl)-; N-p-hydroxybenzyl-; N-(3-hydroxybutyl)-; N-(4-hydroxy-3,5-dimethylbenzyl)-; N-(3-hydroxy-1,1-dimethylbutyl)-; N-(2-hydroxy-1,1-dimethylethyl)-; N-(2-hydroxyethyl)-; N-(5-hydroxy-1-naphthyl)-; combinations thereof and the like. Illustrative acrylamide reactants (B) include N-methylol and N-thiomethyl acrylamides such as N-(hydroxymethyl) acrylamide; N-(hydroxymethyl)-N[(1-hydroxymethyl) propyl] acrylamide; N-(hydroxymethyl)-2-alkyl acrylamides, (e.g., N-(hydroxymethyl)-2-(methyl-hepthyl) acrylamide; N-[(1-hydroxymethyl)-1-nonyl]-2-methyl acrylamide; N-(1-hydroxymethyl)-2-methyl acrylamide; N-(hydroxymethyl)-2-propyl acrylamide; etc.); N-(mercaptomethyl) acrylamide; N-methylol-N-isopropyl acrylamide; 3-(N-methylol acrylamido)-3-methyl butyl trimethyl ammonium chloride (cationic); sodium 2-N-methylol acrylamido-2-methyl propane sulfonate (anionic $-CH_2:C(H)C(:O)N(CH_2OH)C[(CH_3)_2]CH_2SO_3^- N_a^+$), combinations thereof and the like.

Reaction V may be suitably conducted in the presence of known acid or acid-generating catalysts (e.g., ammonium chloride or phosphate, monoammonium acid phosphate, zinc chloride, etc.), preferably at temperatures between about 70° to about 95° C. until the desired D.S. level is achieved. Conventional polymerization inhibitors (e.g., hydroquinone, its derivatives, 2,5-di-t-butylquinone, etc.) prevent homopolymerization of the starch acrylamide and acrylamide reactants. The starch acrylamides may be prepared via solution, slurry, dry, semi-dry or other appropriate condensation processes. To prepare a starch-acrylamide having a D.S. level of 0.03 or higher, it is desirable to uniformly disperse the acrylamide, acid or acid-generating catalyst and polymerization inhibitor throughout the starch reactant. Uniform dispersal of the N-methylol-acrylamide reactant, catalyst and polymerization inhibitor throughout the starch may be effectively accomplished by initially forming a starch slurry or treating the starch with an absorbable dispersant media (e.g., water) in which the acrylamide, catalyst and polymerization inhibitor are soluble or placed in mobile form and thereafter imbibing or absorbing the dispersant and its solutes into the starch granules.

As more fully explained hereinafter, the most appropriate ethylenic unsaturates for optimum water-absorbency will depend upon the starch chain type. An ethylenically unsaturated monoglucoside will typically require at least a D.S. of about 2.0 or more, whereas long chain starch chains (e.g., unhydrolyzed starch) typically require a considerably lower D.S. level (e.g., 0.0002) to be water-absorbent. Moreover, there exists a direct relationship between the D.S. for any given starch chain and the optimum water-absorbency which may be achieved from the starch copolymerizate thereof. An insufficient or excessive ethylenic unsaturation D.S level will generally result in a copolymerizate having poor water-absorbency properties. A D.S. deficiency will fail to provide the necessary multifunctional polymerization sites for the water-absorbency materials. For a majority of starches, however, a starch copolymerizate which is capable of absorbing several times its own weight can be typically obtained by copolymerizing a starch which has an ethylenic unsaturation ranging from about 0.002 D.S. to about 0.10 D.S. Higher ethylenic unsaturated D.S. levels (e.g., 0.2 or higher) wil usually require more carefully controlled copolymerization conditions with an appropriate proportion of ethylenically unsaturated monomers and type of monomer. Starch copolymerizates which typically absorb more than 10 times their weight in water are obtained from starches having an ethylenic unsaturation ranging from about 0.005 D.S. to about 0.05 D.S. For applications requiring a more highly water-absorbant starch (e.g., greater than 100 times the starch dry weight), it is advantageous to use starch substrates which contain appendant ethylenic unsaturation at a level ranging from about 0.005 D.S. to about 0.01 D.S.

The starch copolymerizate water-absorbency properties are directly related to its lattice (i.e., molecular configuration) and its ionic hydrophilicity. The characteristics of the starch chain and the polymeric linkages formed by the interpolymerized ethylenically unsaturated monomers primarily dictate the copolymerizate lattice structure. Failure to achieve proper polymeric linkage of bridging between starch molecules will adversely affect the water-absorbency properties of the starch copolymerizate. Excessively long polymeric monomer linkages tend to result in an excessively open structure which adversely affects the water-absorbency character of the starch copolymerizate lattice. Conversely, excessive cross-linking (e.g., high D.S. ethylenically unsaturated starch) or an insufficient amount of copolymerized monomer (e.g., very short linkages between starch molecules) tend to create a closed lattice and concomitant loss in water-absorbency. The net ionic charge of the copolymerizate in conjunction with its water porous lattice contributes to its water absorption and retention properties. Similarly, achievement of the optimum lattice and an insufficient ionic charge impairs its water-absorbency. The combination of a proper lattice and a sufficient level of ionic charge to attract and absorb water molecules within its porous lattice provides maximum water-absorbency.

In the water-absorbent starch copolymerizate, the copolymerized ethylenic unsaturated monomers (i.e., $—[M]_p$, of Formula I) contain a sufficient number of hydrophilic substituents (e.g., $\leftarrow(W)_n$ of Formula I) to impart water-absorbency to the copolymerized starch product. Illustrative hydrophilic substituents include cationic, anionic, nonionic, ampholytic, zwitterionic, amphoteric moieties, mixtures thereof and the like. As mentioned above, it is unnecessary for each copolymerized monomeric unit to be a water-attractant group. Thus, a significant portion of the polymeric chain units may be free from ionic substituents with the balance of the units providing a sufficient level of "W" substitution to render the starch copolymerizate water-absorbent. The degree of "W" substitution necessary to achieve a water-absorbent starch copolymerizate will depend upon a multiplicity of factors. Factors such as the ionic charge and type of ionic substituents, proportions of ethylenically unsaturated starch to monomer, hydrophilicity and polarity of the copolymerized monomer units, etc. affect the required "W" substitution level. For most application, it is advantageous for the starch copolymerizate to contain either anionic or cationic substituents.

A variety of conventional, ethylenically unsaturated monomers which either contain the water-absorbtive substituents or its precursors may be used to prepare the starch copolymerizates herein. The polymeric linkages may be amphiphilic (i.e., contain both polar water-soluble and hydrophobic water-insoluble groups). Anionic monomers include ethylenically unsaturated monomers which contain acid groups or acid-salt groups or acid-salt precursors. Exemplary anionic substituents include carboxylates, oxalates, benzoates, phosphonates, maleates, malates, phthalates, succinates, sulfate, sulfonates, tartrates, fumarates, mixtures thereof and the like. Illustrative ethylenically unsaturated cationic monomers include nitrogen-containing cations such as primary, secondary and tertiary and quaternary ammonium compounds; sulfur containing cations such as sulphonium salts, halides, etc.; phosphorous containing cations such as phosphonium salts; mixtures thereof and the like. Typical nitrogen containing cations include monomers represented by the formula:

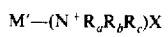

$$M'—(N^+R_aR_bR_c)X^-$$

wherein M' represents an ethylenically unsaturated organo group, $R_a$, $R_b$ and $R_c$ represents at least one member selected from the group consisting of hydrogen and organo group, and X is an anion (e.g., halide, acetate, $CH_3SO_4^-$, $C_2H_5SO_4^-$, etc.). Exemplary $R_a$, $R_b$ and $R_c$ mono-organo groups include substituted and unsubstituted alkyl, monoheterocyclic (e.g. piperidene, morpholine, etc.), hydroxyalkyl, aralkyl, cycloalkyl groups as well as cyclic and heterocyclic groups divalently bonded to the nitrogen atom (e.g., $R_a$ and $R_b$ form a cyclic structure). The preferred nitrogen containing ethylenically unsaturated cationic monomers are the water-soluble, monomeric salts such as the lower alkyls of 1–5 carbon atoms (e.g., ethyl, methyl, propyl); polyoxyalkylene (e.g., polyoxyethylene and polyoxypropylene), mixtures thereof and the like; alkoxy (e.g., methoxy, ethoxy, propoxy, etc.); hydroxyalkyl and polyhydroxyalkyl (e.g., hydroxyethyl, hydroxypropyl, dihydroxypropyl, dihydroxybutyl); heterocyclic amines (e.g., morpholine); amines and amides bearing mono-organics; mixtures thereof and the like. The sulfur and phosphorus containing cationic monomers are similar to the aforementioned except either the phosphorous atom or sulfur atom replaces the nitrogen atom. The preferred phosphorus and sulfur cations are the phosphonium and sulphonium cationic salts. Water-soluble, "W"' ethylenically unsaturated monomers which contain an activating group adjacent to the ethylenic unsaturation (e.g., wherein M' contains a $CH_2=CR—E—$ radical with the activating group "E" and the "R" group being as defined above) are preferred.

Representative cationic monomers include the N-methylol acrylamide reactants mentioned above, dimethylaminoethyl methacrylate; t-butylaminoethyl methacrylate; 2-hydroxy-3-methacryloxypropyl trimethyl ammonium chloride; allyl-trimethyl-ammonium chloride; S-allyl-thiuronium bromide, s-methul(allyl-thiuronium) methosulphate, diallyl-dibutyl-diammonium chloride, diallyl-dimethyl-ammonium methosulphate, dimethallyl-diethyl-ammonium phosphate, diallyl-dimethyl-ammonium nitrate, S-allyl-(allyl-thiuronium) bromide, N-methyl(4-vinylpyridinium) methosulphate, N-methyl(2-vinylpyridinium) methosulphate, allyl-dimethyl-beta-methacryloxyethyl-ammonium methosulphate, beta-methacryloxymethyl-trimethylammonium nitrate; beta-methacryloxyethyl-trimethylammonium p-toluene-sulphonate, delta-acryloxybutyl-tributylammonium methosulphate, methallyl-dimethyl-O-vinylphenylammonium-chloride, octyldiethyl-m-vinylphenyl-ammonium phosphate, beta-hydroxyethyl-dipropyl-p-vinylphenyl-ammonium bromide, benzyl-dimethyl-2-methyl-5-vinyl-phenyl-ammonium phosphate; 3-hydroxypropyl-diethyl-vinyl-phenylammonium sulphate; octadecyl-dimethyl-vinyl-phenyl-ammonium p-toluene sulphonate, amyl-dimethyl-3-methyl-5-vinylphenyl-ammonium thiocyanate, vinyloxyethyl-triethyl-ammonium chloride, N-butyl-5-ethyl-2-vinylpyridinium iodide, N-propyl-2-vinyl-quinolinium methyl sulphate, N-butyl-5-ethyl-3-vinyl-pyridinium iodide, N-propyl-2-vinyl-quinolinium methyl sulphate, allyl-gamma-myristamidopropyl-dimethyl-ammoniumchloride, methallyl-gamma-caprylamido-propyl-methyl-ethyl-ammonium bromide; allyl-gamma-caprylamidopropyl-methylbenzyl-ammonium phosphate, ethallyl-gamma-myristamido-propyl-methyl-alpha-naphthylmethyl-ammonium chloride, allyl-gamma-palmitamidopropyl-ethyl-hexyl ammonium sulphate; methyallyl-gamma-lauramidopropyl-diamyl-ammonium phosphate, propallyl-gamma-lauramidopropyl-diethyl-ammonium phosphate, methallyl-gamma-caprylamido-propyl-methyl-beta-hydroxyethylammonium bromide, allyl-gamma-stearamido-propyl-methyl-dihydroxypropyl-ammonium phosphate, allyl-gamma-lauramidopropyl-benzyl-beta-hydroxyethylammonium chloride and methallyl-gamma-abietamidopropyl-hexyl-gamma'-hydroxypropyl-ammonium phosphate, vinyl diethyl-methyl sulphonium iodide, ethylenically unsaturated nitrogen containing cations having the formula $CH_2=CHQN^+(R_1R_2R_3)X^-$ such as disclosed in U.S. Pat. No. 3,346,563 by Shildneck et al. with Q, $R_1$, $R_2$, $R_3$ and $X^-$ groups being defined as above, mixtures thereof and the like.

Representative anionic monomers include vinyl sulfonic acid and vinyl sulfonates (e.g., see U.S. Pat. Nos. 3,970,604 by G. Wentworth and 2,859,191 by Turnbull, etc.); allylsulfosuccinic acid and allyl sulfosuccinates (e.g., see U.S. Pat. No. 3,219,608 by Ingleby et al.); sulfo esters of alpha-methylene carboxylic acids and salts thereof (e.g., see U.S. Pat. No. 3,024,221 by LeFevre et al.); sulfo-organic esters of fumaric and maleic acids and salts thereof (e.g., see U.S. Pat. No. 3,147,301 by Sheetz); acids and salts of sulfatoalkane acrylates and methacrylates (e.g., see U.S. Pat. Nos. 3,893,393 by Steckler and 3,711,449 by Brendley) acrylamidoalkane-sulfonic acid and salts (e.g., see U.S. Pat. Nos. 4,008,293 by Maska et al. and 3,946,139 by Bleyle et al.), vinyl phosphonic acid and vinyl phosponates; alpha, beta-ethylenically unsaturated carboxylic acids, their salts (e.g., acrylic acid, methacrylic acid, ethacrylic acid, propacrylic acid, butacrylic acid, itaconic acid, monoalkyl esters of itaconic acid, crotonic acid and crotonates, fumaric acid and fumarates, etc.), mixtures thereof and the like.

The water-absorbent starches may be prepared by initially copolymerizing the starch with ethylenically unsaturated comonomers which contain reactive sites (e.g., polar or unpolymerized ethylenic unsaturation) which are then derivatized to "W" moieties. For example, the ethylenically unsaturated starches herein may be copolymerized with unsaturated precursors and converted to the anionic form such as by saponification to replace the alkyl ester group with a metal salt, and known techniques of derivatizing organic compounds to acidic or the neutralized acid-salt form. Preferably the starting monomers contain the hydrophilic structure or one which can be directly converted to its "W" form by neutralization. This will avoid the derivatization step as well as the possibility of contaminating the copolymerizate with salts and minerals, and the need to wash and refine to remove such contaminants therefrom.

The polymeric linkages between copolymerized starch chains may be comprised of interpolymerized ionic monomeric units and monomeric units free from "W" substituents. The interpolymerized monomeric units free from "W" substituents may be selected from a broad range of ethylenically unsaturated monomers. Hydrophilic and/or hydrophobic comonomers may be used for this purpose. Illustrative interpolymerized comonomers include vinyl aromatics (e.g., styrene and styrene derivatives); the alkyl esters of alpha, beta-ethylenically unsaturated acids; the alpha, beta-ethylenically unsaturated nitriles, alpha, beta-ethylenically unsaturated amides; vinyl halides (e.g., vinyl chloride and bromide), olefins such as mono- and di- olefins, vinylidene halide (e.g., vinylidene chloride and bromide), vinyl esters (e.g., vinyl acetate and derivatives); diesters of alpha, beta-ethlenically unsaturated dicarboxylic acids (e.g., dimethyl or diethyl itaconate, dimethyl or diethyl maleate, diethyl or dimethyl fumarate, etc.); alkyl vinyl ethers such as methyl or ethyl vinyl ether, etc.; alkyl vinyl ketones (e.g., methyl vinyl ketone, etc.), mixtures thereof and the like.

The polymeric linkages are advantageously predominantly comprised of polar or water-soluble monomeric units. Illustrative polar or water-soluble comonomers free from "W" substituents which may be copolymerized with the "W" monomers and the starch include the hydroxyalkyl esters of alpha, beta-ethylenically unsaturated carboxylic acids such as hydroxyethyl, hydroxyethoxyethyl, hydroxymethyl, 2-3-dihydroxypropyl acrylates and methacrylates, di(2,3-dihydroxypropyl) fumarate, di(hydroxyethyl) itaconate, ethyl hydroxyethylmaleate, hydroxyethyl crotonate, mixtures thereof and the like; the lower alkyl esters of alpha, beta-ethylenically unsaturated carboxylic acids (e.g., $C_1$ to $C_2$ alkyl ester of mono- and di-carboxylic acid such as methyl and ethyl ester of acrylic, methacrylic, itaconic, fumaric, crotonic, maleic, etc.); N-(3-methylamino) propyl methacrylate; 1-butylaminoethyl methacrylate; di-methylaminoethyl methacrylate; beta-(5-butylamino)ethyl acrylate; 2-(1,1,3,3-tetra-methyl-butylamino) ethyl methacrylate, etc.); alpha, beta-ethylenically unsaturated nitriles (e.g., acrylonitrile, methacrylonitrile, ethacrylonitrile, etc.); alpha, beta-ethlenically unsaturated amides (e.g., acrylamide and the N-substituted acrylamides such as N-methyl, N-ethyl, N-propyl, N-N-dimethyl and N-N-diethyl, N-butyl, etc. acrylamides or methacrylamides or ethacrylamides, N-(beta-dimethylamino)-ethyl acrylamide, N-(beta-dimethylamino)ethyl methacrylamide, etc.); vinyl esters (e.g., vinyl acetate, etc.), vinyl alcohol and vinyl ethers (e.g., methyl or ethyl vinyl ether, diethylaminoethyl vinyl ether, diethylaminoethyl vinyl sulfide, 5-aminopentyl vinyl ether, 3-aminopropyl vinyl ether, 2-aminoethyl vinylether, N-methylaminoethyl vinyl ether); alkyl vinyl ketones (e.g., methyl vinyl ketone, etc.); vinyl pyridine, vinyl pyrrolidone, mixtures thereof and the like.

The proportions of ethylenically unsaturated starch copolymerized with the ethylenically unsaturated monomers should typically be sufficient to provide a starch copolymerizate which is capable of absorbing at least 10 times it dry weight in water. The monomer type and starch type will affect the proportions needed to achieve optimum water-absorbency. In general, the monomer dry weight will usually fall within the range of about 5 to about 2000 parts by weight for each 100 parts by weight of the ethylenically unsaturated starch. For water-absorbency properties which exceed 50 times the starch copolymerizate weight, about 10 to about 1000 parts by weight copolymerizable monomer for each 100 parts by weight ethylenically unsaturated starch is typically required. The amount of "W" monomeric units within the polymeric linkage will usually comprise from about 25 to 100% of the copolymerized monomer weight and advantageously at least a major weight of the polymeric linkage. Water-absorbent copolymers capable of absorbing at least 100 times their dry weight in water are most suitably prepared from about 100 to about 750 parts by weight "W" monomer, and from 0 to about 200 parts by weight ethylenic monomer free from "W" monomers for each 100 parts by weight ethylenically unsaturated starch.

The water-absorbent starch copolymerizates are advantageously prepared under aqueous polymerization conditions. Homogeneity of the reactants throughout the aqueous phase results in more uniform and reproducible water-absorbent properties. Ethylenically unsaturated starch and ethylenically unsaturated monomer systems which provide homogeneous dispersions essentially free from centrifugal residue and/or supernatant (e.g., heated to a temperature above the starch gelation point to gelatinize the starch and centrifuged for 10 minutes at $10^3$g's) as evidenced by less than 10% by weight centrifuged residue (preferably less than 5%) are particularly well suited systems for preparing the water-absorbent starch copolymerizates.

In thermal fabrication processes (e.g., molding, calendering, extrusion, etc.), a relatively high monomer and starch to water weight ratio (5:1 to 9:1) is typically used. At the reduced water levels and elevated monomer levels, incompatability of the ethylenic unsaturated monomer and starch system can arise. Elevated fabricating temperatures and pressures may be used to improve upon the compatibility of this system. Likewise water-miscible solvents in which the ethylenic unsaturated monomers are soluble (e.g., such as glycerol) or emulsifying agents may be effectively utilized to enhance the water-dispersibility of the monomer-starch system into the aqueous phase. In extrusion operations, a sufficient amount of water (with or without conventional starch plasticizers) to convert the polymerizable mass to a molten plasticized mass at elevated temperatures (e.g., 80°–250° C.) and pressures is used. The molten mass is then extruded through a die orifice into an atmosphere of reduced pressure and temperature maintained below the boiling point (B.P.) to produce void-free extrudates and above its B.P. to produce puffed extrudates.

In coating applications, it is particularly advantageous to utilize a gelatinized or pregelatinized starch. Aqueous coating compositions containing the low viscosity ethylenically unsaturated starch hydrolyzates are particularly useful when it is desired to coat substrates at dry binder weight levels of at least 40%. Substrates may be uniformly wetted and coated at solids levels ranging from about 50 to 75% by weight with stability against syneresis, separation and viscosity changes. Such coatings dry easily at nominal evaporation costs. Depolymerization of the starch to the appropriate short chain length (e.g., D.E. 0.2–100) for coating applications may be accomplished by conventional saccharification and/or thinning techniques (e.g., acid or enzymatic). The starch chains may be depolymerized to the appropriate chain length prior or after the ethylenically unsaturated derivatives are prepared. Starch chains having a degree of polymerization comparable to that achieved by alpha-amylase hydrolysis of starch to a D.E. ranging from about 0.1 to 32 (advantageously from about 0.25 to about 15 and most preferably less than 10) may be effectively used to coat substrates. The reduced starch chain length will not adversely affect starch coating permanence provided the ethylenically unsaturated D.S. is sufficiently high enough to provide chains which contain multifunctional unsaturation sites.

In most coating applications, the water content is typically adjusted to a fluidity most suitable to coat the substrate. The starch coating composition viscosity may vary considerably and depends to a large extent upon the type of coating operation employed (e.g., from about 1 to about 40,000 cps or higher for extrusion coating). The proportions of water, monomer and ethylenic unsaturated starch weight ratios may likewise vary considerably (e.g., about 5 to about 10,000 parts by weight, i.e., pbw, water and about 1 to about 5,000 pbw monomer for each 100 pbw ethylenically unsaturated starch). In coating operations conducted under ambient temperatures, it is advantageous to utilize a homogeneous starch coating composition of viscosity greater than about 10 cps but less than 5,000 cps (most typically between about 20 cps to 1,000 cps) and containing from about 25 to about 800 pbw water and about 10 to about 2,000 pbw ethylenically unsaturated monomer for each 100 pbw ethylenically unsaturated starch. Water-miscible organo solvents or surfactants are desirably incorporated into the coating composition for purposes of achieving homogeneity and a uniform monomer dispersion if the starch coating formulation contains a low amount of water and a high monomer concentration. Starch coating compositions which are adapted for use in high-speed coating operations are typically formulated at a viscosity ranging from about 100 cps to about 300 cps (with or without fugitive organo solvents or surfactants at about 30 to about 500 pbw water and about 25 to about 1,000 pbw (preferably between about 50 to about 500 pbw) ethylenically unsaturated monomer for each 100 pbw ethylenically unsaturated starch. In formulations for high-speed coating operations, starch coating homogeneity is more easily achieved by using less than 3 weight parts ethylenically unsaturated monomer for each 2 weight parts of water and preferably at a weight ratio of less than one part monomer for each water part.

The copolymerizates are copolymerized by conventional polymerization initiating means. The unpolymerized starch and monomers may be conveniently prefabricated into the desired configuration and then copolymerized in situ via such conventional polymerization initiating systems. The starch compositions will undergo copolymerization upon exposure to conventional irradiation processes which generate in situ polymerization initiators therein (e.g., electron-beam, X-ray, alpha-ray, gamma-ray, etc. initiation). Alternatively, free-radical catalysts or free-radical precursors may be uniformly incorporated into the unpolymerized starch composition which will then latently copolymerize upon exposure to appropriate initiating conditions (e.g., photochemical, ultra-violet, heating or microwave techniques, etc.).

Conventional free-radical polymerization initiators at levels sufficient to copolymerize the ethylenic unsaturated starch and monomer (e.g., about 0.2 to about 20% on a starch-monomer weight basis) which may be incorporated into the starch composition include the organic and inorganic peroxides (e.g., hydrogen peroxide, benzoyl peroxide, tertiary butyl hydroperoxide, diisopropyl benzene hydroperoxide, cumene hydroperoxide, caproyl peroxide, methyl ethyl ketone peroxide, etc.), oxidation-reduction initiator systems (ammonium, potassium or sodium persulfates or hydrogen peroxide with reducing agents such as sodium bisulfites, sulfites, sulfoxylates, thiosulfates, hydrazine, etc.); azo initiators (e.g., tertiary aliphatic azo compounds which undergo homolytic dissociation) such as azo di-isobutyronitrile, phenylazotriphenylmethane, 1,1'-azodicyclohexanecarbonitrile, 1,1-dimethylazoethane; diazoamino compounds (e.g., 3,3-dimethyl-1-phenyl-triazene and aryldiazo thioethers) and other free-radical generating catalysts such as certain aromatic ketones (e.g., benzoin methyl ether, benzophenone and its derivatives), chlorinated aromatics as well as other free-radical type of polymerization initiators. Free-radical initiator systems which require externally applied energy (e.g., thermally, photochemical, etc.) for free-radical generation may be used to provide a latently copolymerized system. Advantageously the free-radical polymerization initiators are uniformly dispersed throughout the aqueous phase of the starch composition at levels ranging from about 0.3 to about 10% (based on polymerizable starch and monomer dry weight).

Polymerization initiation via U.V. and white light sources (e.g., 200-430 nanometer (nm) range, such as by carbon arc lamps, Zenon lamps, high pressure mercury lamps) is particularly useful in high-speed coating operations. If desired, conventional photosensitizers (e.g., triethanol amine-soluble benzophenones, eosin-sulfonates, methylene blue-sulfinate, combinations thereof, etc.) by active energy transfer may be incorporated into the starch composition to facilitate the copolymerization initiation reaction. The ultra-violet polymerization initiating processes are generally suitable for coatings or films of a thickness of less than about 20 mils (preferably less than about 10 mils). Thicker starch polymerizate articles or films normally require higher penetrating irradiation devices (e.g., X-ray, electron-beam, gamma generation, etc.) or thermal induction. The ultra-violet copolymerization process is particularly effective for high solids starch coating applications (e.g., about 55 to about 75% dry solids) because it simultaneously dries and copolymerizes the starch coating in a single step. Water-dispersible, non-fugitive free-radical initiating systems (e.g., catalysts which evaporate or do not leave catalytic residue in the copolymerizate) such as hydrogen peroxide are preferred.

The water-absorbent starch copolymerizates have a wide and divergent field of use. A major advantage of the water-absorbent starches of this invention resides in the ability to apply the unpolymerized product to a substrate or prefabricate it into the desired shape or configuration and then convert it to a water-absorbent, starch copolymerizate. The unpolymerized product can be applied to divergent substrates ranging from natural and man-made products and thereafter polymerized in situ to form an integrated product of unitary construction. This advantage is particularly useful for applications wherein it is desirable to permanently affix or impregnate a natural or synthetic substrate (e.g. films, webbings, fibers, filaments, etc.) with the water-absorbent starch. Illustrative applications for the water-absorbent starches include hygenic pads, bandages, surgical and catamenial tampons, sanitary napkins, diapers, antiperspirant and deodorant pads, sponges, surgical pads, sorptive dental rolls, disinfectants, decorative seedling films, etc. If desired, the water-absorbent starch copolymerizates may be admixed with natural starch and man-made products for such divergent uses as cosmetics, water scavengers, paint removers, solid humectants, pesticides, improving the water-holding capacity of soils, catalysts or chemical carrier, binders, etc.

The following examples are merely illustrative and should not be construed as limiting the scope of the invention.

EXAMPLE 1

An aqueous acrylamidomethyl starch hydrolyzate (D.S. 0.009) was prepared employing the following proportions of reagents.

| Parts by weight (pbw) | Reagents |
|---|---|
| 279 | STA-TAPE 100 Starch[1] (250 parts by weight dry starch) |
| 21 | N-methylolacrylamide (as 60% aqueous soln.) |
| 25.8 | Ammonium dihydrogen phosphate (acid catalyst) |
| 0.004 | Methyl hydroquinone (polymerization inhibitor) |
| 247 | water |

[1] STA-TAPE 100 - manufactured by the A. E. Staley Manufacturing Company-A low viscosity, acid-thinned, granular waxy maize starch (100% amylopectin) typically characterized as having a Brookfield viscosity of about 500 cps (#2 spindle, 20 rpm, 150° C. at a dry solids of 40-45%) and a D.E. of less than 1%.

The ingredients were mixed and filtered on a Buchner funnel. The starch cake was sucked free of excess aqueous phase and the unwashed cake (with 63 percent retention of non-starch reagents) was air-dried to a 10 percent drying loss. The dried reaction premix had the following ratios of reagents (pbw) — 250 starch; 7.95 N-methylolacrylamide, 0.025 methyl hydroquinone; 29 water. The powdered reaction premix was layered onto a stainless steel tray and heated for 2 hours in a forced air oven at 75.5° C. After resuspending in distilled water, filtering and washing free of unreacted reagent impurities, the dried product contained 0.10 percent nitrogen (dry basis), which when corrected for the nitrogen in the STA-TAPE 100 starch (0.022 percent) is equivalent to a D.S. of 0.009. Further information on the preparation of the acrylamidomethyl starches may be found in co-pending U.S. patent application Ser. No. 680,549, filed Apr. 27, 1976 by Young et al.

A portion of the acrylamidomethyl starch (0.77 grams) was homogeneously dispersed into 8.43 grams water (15 minutes at its boiling point) and cooled to ambient temperature in a 50 ml. flask. Acrylic acid (0.48 grams) and arylamide (0.24 grams) were homogeneously dispersed into the acrylamido starch solution followed by the addition of a 0.0169 grams (d.s.b.) ammonium persulfate (2.28% aqueous solution) and 0.0076 gram (d.s.b.) of sodium bisulfite (1.04% aqueous solution). Then 0.002 gram (d.s.b.) of ferrous sulfate (0.28 wt.% FeSO$_4$.7H$_2$O aqueous solution) was added which caused an exothermic copolymerization of the ethylenic unsaturates. Within 1 minute the entire reaction medium had gelled (12.1/g) into a copolymerizate which could be agitated with a magnetic stirrer. To convert the acrylic moieties to the anionic salt form, 0.42 gram of solid potassium hydroxide was added. The resultant viscous dispersion (12.53 g total) was then stirred for 15 minutes. The sample contained 15.24 wt.% solids. The gel was then diluted to 5 wt.% dry solids with 25.64 g distilled water and allowed to stand for 24 hours. Thereafter the dispersion (36.84 grams) was further diluted with 55.26 g distilled water to provide a 2% gel solids dispersion. The viscosity of the dispersion respectively after standing for 6 and 23 hours (#4 spindle at 20 rpm) was 500 cps and 3500 cps. The solid was again diluted with 90.52 g of distilled water (1% dry solids dispersion) which afer 29 hours standing had a 700 cps viscosity (#4 spindle at 20 rpm) and after 58 hours a viscosity of 710 cps. The 1% gel dispersion was ambiently air-dried (evaporating dish for 11 days). A 0.1526 g sample of the resultant gummy resin was transferred and hydrated with 11.85 grams of distilled water in a 15 ml. centrifuge tube. The sample swelled to the 12 ml. volume. The hydrated sample was centrifuged for 15 minutes at $10^3$ g's. The supernatant liquid was decanted into a tared aluminum pan. 11.38 grams of the swollen gel was transferred to a 50 ml. centrifuge tube and diluted with 11.38 grams of water and allowed to swell for 17 hours followed by centrifugation for 15 minutes at $10^3$g's. The supernatant (pH 6.6) along with the aforementioned supernatant was analyzed for water-soluble starch (0.0423 grams or 27.7% by weight via evaporation).

The copolymerizate weight swelling ratio (WSR) was determined by the equation $WSR = I/O-S$ wherein I, O and S respectively represent the weight of swollen insolubles, 9.63 grams; original sample 0.1526 grams and solubles, 0.0423 grams (i.e., $$WSR = \frac{I}{O-S} = \frac{9.63}{0.1526 - 0.0423} = 87.$$

EXAMPLE II

A cationic, water-absorbent starch copolymerizate was prepared by copolymerizing (in 34.6 pbw distilled water) 8.5 pbw (0.008 moles) acrylamidomethyl starch (d.s. 0.008), 30.9 pbw

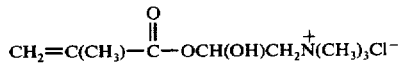

(0.0199 moles) and 11.1 pbw acrylamide (0.0241 moles). The copolymerization reaction was exothermically initiated with 0.1 pbw ammonium persulfate (0.13(NH$_4$)$_2$S$_2$O$_8$ + 5 pbw water), 0.07 pbw sodium bisulfite (0.07 pbw NaHSO$_3$ + 5 pbw water) and 0.01 pbw FeSO$_4$.7H$_2$O (0.01 pbw FeSO$_4$.7H$_2$O + 4.7 pbw water). Within 90 seconds the copolymerization reaction was completed to yield a water-absorbent, hydrated copolymerizate gel. This cationic gel was analyzed in accordance with the test procedure of Example I at 25° C. The copolymerizate contained 73% (by weight) insoluble copolymerizate solids and 27% (by weight) solubles and had a 152 WSR. The insoluble copolymerizate absorbed 152 times its dry weight of water at a pH 4.0 and 25° C.

EXAMPLE III

A cationic water-absorbent starch copolymerizate was prepared by copolymerizing 0.008 moles acrylamidomethyl starch (D.S. 0.008 at 8.45 pbw), 0.0243 moles acrylamide (11.25 pbw) and 0.01673 moles

(30.82 pbw) with the exothermic initiating system of Example II. The resultant copolymerizate gel (copolymerization completed within 150 seconds after initiation) was admixed with 2000 ml. water and allowed to swell for 8 days at 25° C. The decanted supernatent liquid portion thereof contained 20.18% water-solubles. The insoluble copolymerizate (79.82% of the total copolymerizable reactants) absorbed 86 times it weight of water at pH 3.6 and 25° C.

EXAMPLE IV

Employing the polymerizate initiating system of Example II, 10 pbw acrylamidomethyl starch (D.S. 0.008) was copolymerized (about 3 minutes) in 56 pbw distilled water which contained 9 pbw potassium hydroxide with 12 pbw acrylic acid and 12 pbw acrylamide. The anionic copolymerizate gel (tested via the Example III water-absorbency test) absorbed 119 times its dry weight of water. This example was repeated again with a 0.056 D.S. starch. The 0.056 D.S. copolymerizate gel only absorbed 27 times its dry weight in water. The lower water absorbency for the 0.056 D.S. acrylamidomethyl starch copolymerizate is apparently attributed to its more highly cross-linked structure.

EXAMPLE V

This example illustrates a water-absorbent copolymerizable starch coating composition which may be copolymerized in situ to provide a substrate (e.g., textile, papers, etc.) coated with the water-absorbent, starch copolymerizate. The copolymerizable coating composition (pH 6.0) consisted of 10 pbw acrylamidomethyl starch (0.01 D.S.)[2], 47 pbw distilled water, 12 pbw acrylic acid, 12 pbw acrylamide, 9 pbw potassium hydroxide and 10 pbw aqueous hydrogen peroxide (30%).

[2] - The 0.01 D.S. acrylamidomethyl starch hydrolyzate contained an average of approximately two acrylamidomethyl groups for each starch molecule.

Five grams of the copolymerizable composition was placed in an aluminum weighing pan (2 inches I.D.) and irradiated an inch away from a 275 watt sun lamp for 1 minute to give a firm gel. Another portion of copolymerizable starch composition was applied with a #40 wire wound rod to a 4 × 12 inch glass plate and irradiated 6 passes at 20 ft./min. at 1.5 inches under a Hanovia 679A lamp. The copolymerizable starch composition gelled on the first pass (1/6 sec.) and converted to a dry film after the sixth pass through the irradiator (i.e., 1 second). The WSR for the resultant starch copolymerizates were 150. A 0.056 D.S. acrylamidomethyl starch was used instead of the 0.01 D.S. acrylamidomethyl starch to provide a copolymerizate with a WSR of 30.

In another test, a 0.014 D.S. acrylamidomethyl starch was substituted for the 0.01 D.S. acrylamidomethyl starch reactant and applied to the glass plates with a #40 wire wound rod (pH 6.2; 25-36 cps viscosity, #1 spindle, at 20 rpm at 25° C.). After 4 passes the irradiator, a dry, water-absorbent film coating 83.51% insoluble copolymerizate dry solids and a WSR of 120 was obtained. This test was repeated by immersing three cotton cloth pieces (18 × 6 inches) in the 0.014 D.S. copolymerizable starch coating compositions, passing the coated cotton through the rolls of a Birch Brothers Padder, placing the coated cotton pieces on glass plates and then irradiating the three samples for 4, 6 and 8 passes. The dry coating add-on was 46% by weight. The water swelling ratios were 120 for 4 irradiation passes, 86 for 8 passes and slightly more than 100 for the cloth which was exposed to 6 passes.

Although the aforementioned Examples primarily illustrate the use of relatively high-molecular-weight starch chains, the invention applies to a broad range of ethylenically unsaturated glucose-containing monomers such as those ranging from a completely hydrolyzed starch (e.g., dextrose) to an unhydrolyzed starch. The glucose-containing monomers which contain multifunctional ethylenically unsaturated groups provide the necessary structure for the porous lyophilic network. The most appropriate D.S. level for a glucose-containing monomer will depend upon the number of glucose units present in its starch chain. To achieve multifunctional copolymerizable groups for a monosaccharide, disaccharide, trisaccharide or tetrasaccharide monomer would respectively require a D.S. of 2.0, 1.0, 0.66 and 0.5 with the oligosaccharides (e.g., D.P.$_4$+) and higher starch chains requiring a corresponding lesser D.S. to achieve multifunctionality. In contrast, the higher molecular weight starches (e.g., unhydrolyzed starches) will typically have multifunctional copolymerizable groups at a D.S. of 0.0002 or less.

Since the starch copolymerizates as described herein possess a porous structure, their lyophilic properties can be altered via the composition and character of unsaturated starches, monomers and lyophilic groups which are used in their preparation. By replacing the polar, water-attractant groups with non-polar and oil or solvent attractant groups, starch copolymerizates which may be tailor-made to absorb specific solvents, chemicals and/or water-immiscible liquids (e.g., oil) are now possible. Similarly, lyophilic and amphophilic starch copolymerizates may be obtained by starch copolymerizates which contain both polar water-soluble and hydrophobic, water-insoluble substituents.

Since many embodiments of this invention may be made and since many changes may be made in the embodiments described, the foregoing is interpreted as illustrative and the invention is defined by the claims appended hereafter.

What is claimed is:

1. A water-absorbent starch copolymerizate which is capable of absorbing several times its own weight in water, said starch copolymerizate comprising the copolymerizate product of ethylenically unsaturated starch molecules and ethylenically unsaturated monomers with said ethylenically unsaturated monomers forming a connective polymeric linkage between said copolymerized starch molecules to provide a non-linear lattice of a plurality of starch chains linked together by polymeric linkages represented by the formula:

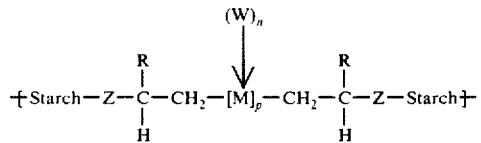

wherein Starch represents a starch chain of D-glucose units, Z represents an organo group which links the

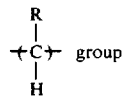

to the carbon atom of the starch chain by a sulfur atom or an oxygen atom, R is a member selected from the group consisting of hydrogen and a monovalent organic radical, M represents a plurality of copolymerized ethylenically unsaturated monomers with "p" representing the number of copolymerized monomeric units in said linkage, (W) is a water-attractant group linked to the polymeric linkage and "n" represents the number of (W) moieties contained within the polymeric linkage of said copolymerized monomers with the number of (W) moieties being sufficient to impart water-absorbency properties to said copolymerizate.

2. The water-absorbent starch copolymerizate according to claim 1 wherein the Z organo group consists essentially of a

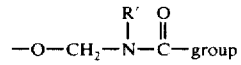

and R' is at least one member selected from the group consisting of hydrogen and a mono-organo group joined directly to the nitrogen atom by a monovalent bond.

3. The water-absorbent starch composition according to claim 1 wherein the ethylenically unsaturated starch molecules consist essentially of starch molecules and appendant ethylenic unsaturated groups of a molecular weight ranging from greater than 50 to less than 300 and the degree of substitution of said ethylenically unsaturated appendant groups range from about 0.002 to about 0.1.

4. The water-absorbent starch according to claim 3 wherein "W" is at least one member selected from the group consisting of anion, cation, nonion and zwitterion.

5. The composition according to claim 4 wherein the weight of ethylenically unsaturated monomer in said copolymerizate ranges from about 10 to about 1000 parts by weight for each 100 parts by weight of copolymerized ethylenically unsaturated starch and from about 25 to about 100% of the copolymerized ethylenically unsaturated monomer contains the "W" substitutent.

6. The water-absorbent starch composition according to claim 4 wherein the copolymerized ethylenically unsaturated starch consists essentially of amylopectin hydrolyzate with a degree of substitution of said starch ethylenic unsaturated groups ranging from about 0.005 to about 0.05.

7. The water-absorbent starch according to claim 4 wherein the copolymerized ethylenically unsaturated starch consists essentially of an acrylamide starch having a D.S. ranging from about 0.005 to about 0.05 and a D.E. ranging from about 0.25 to about 15, and the copolymerizate contains 100 parts by weight copolymerized ethylenically unsaturated starch hydrolyzate, from about 100 to about 750 parts copolymerized ethylenically unsaturated monomer which contain "W" groups and from 0 to about 200 parts by weight of copolymerized ethylenically unsaturated monomers devoid of said "W" groups.

8. A method for preparing a water-absorbent starch copolymerizate, comprised of a plurality of starch chains linked together by polymeric linkages represented by the formula:

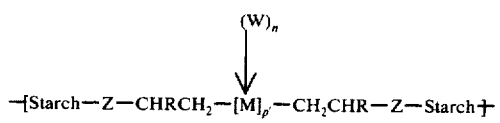

wherein Starch represents a starch chain of D-glucose units, Z represents an organo group which links the

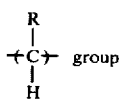 group to the carbon atom of the starch chain by a sulfur atom or an oxygen atom, R is a member selected from the group consisting of hydrogen and a monovalent organic radical, M represents a plurality of copolymerized ethylenically unsaturated monomers which contain a sufficient number of (W) groups to impart water-absorbency to said copolymerized product, "$p'$" represents the number of copolymerized ethylenically unsaturated monomers linking together said starch chains, said method comprising copolymerizing:

(a) starch chains containing appendant, terminal ethylenic unsaturated groups represented by the formula:

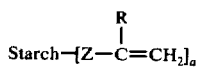

wherein Starch, Z and R are as defined above, and "$a$" represents the degree of substitution of said terminal unsaturated groups on said starch chain, and (b) ethylenically unsaturated monomers represented by the formula:

wherein M' represents an ethylenically unsaturated monomer, "(W')" represents at least one member selected from the group consisting of water-attractant group or a precursor of a water-attractant group, and $n'$ in an integer with the proviso that when the copolymerized M'—(W')$_{n'}$ monomer consists essentially of a precursor of said water-attractant group, a sufficient number of the precursor groups are derivatized to a water-attractant group to impart water-absorbing properties to said starch copolymerizate.

9. The method according to claim 8 wherein (W') is at least one water-attractant group or a precursor of a water-attractant group selected from the group of anion, cation, nonion, and zwitterion, and Z represents an organo group which links the —CRH— group to the starch chain by an oxy moiety.

10. The method according to claim 9 wherein Z comprises an organo group represented by the formula:

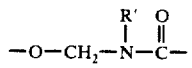

and R' is at least one member selected from the group consisting of hydrogen and a mono-organo group joined directly to the nitrogen atom by a monovalent bond.

11. The method according to claim 10 wherein the appendant ethylenic unsaturated groups of the starch chains consist essentially of groups having a molecular weight ranging from about 75 to about 150 and "$a$" represents a degree of substitution ranging from about 0.002 to about 0.1.

12. The method according to claim 10 wherein from about 25% to 100% by weight of ethylenically unsaturated monomers contain the "W'" group and the copolymerized weight of ethylenically unsaturated monomer ranges from about 10 to about 1000 parts by weight ethylenically unsaturated monomer for each 100 parts by weight ethylenically unsaturated starch.

13. The method according to claim 12 wherein the ethylenically unsaturated starch consists essentially of amylopectin hydrolyzate and "$a$" represents a degree of substitution ranging from about 0.003 to about 0.05.

14. The method according to claim 9 wherein the ethylenically unsaturated starch consists essentially of an acrylamido starch hydrolyzate having a D.S. ranging from about 0.005 to about 0.10 and a D.E. ranging from about 0.25 to about 15, and 100 parts by weight of the ethylenically unsaturated starch hydrolyzate is copolymerized with from about 100 to about 750 parts copolymerized ethylenically unsaturated monomers containing the "W'" groups and from 0 to about 200 parts by weight ethylenically unsaturated monomers free from said "W'" groups.

15. The method according to claim 14 wherein Z represents an organo group having the formula:

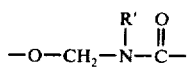

with R' representing either hydrogen or a lower alkyl group of 1 to 3 carbon atoms inclusive, and R represents either hydrogen or methyl.

16. The method according to claim 15 wherein the starch chains consist essentially of an amylopectin hydrolyzate and "W" represents at least one member selected from the group consisting of an anion and cation.

17. The method according to claim 8 which includes the additional steps of applying the unpolymerized ethylenically unsaturated starch and ethylenically unsaturated monomers to a substrate and thereafter copolymerizing in situ the applied starch and monomers.

18. The method according to claim 9 which includes the additional steps of applying the unpolymerized ethylenically unsaturated starch and ethylenically unsaturated monomers to a substrate and thereafter copolymerizing in situ the applied starch and monomers.

19. The method according to claim 11 which includes the additional steps of applying the unpolymerized ethylenically unsaturated starch and ethylenically unsaturated monomers to a substrate and thereafter copolymerizing in situ the applied starch and monomers.

20. The method according to claim 14 which includes the additional steps of applying the unpolymerized ethylenically unsaturated starch and ethylenically unsaturated monomers to a substrate and thereafter copolymerizing in situ the applied starch and monomers.

21. The method according to claim 16 which includes the additional steps of applying the unpolymerized ethylenically unsaturated starch and ethylenically unsaturated monomers to a substrate and thereafter copolymerizing in situ the applied starch and monomers.

22. The water-absorbent substrate of a unitary construction comprised of a substrate and the water-absorbent starch copolymerizate of claim 1.

23. In a water-absorbent substrate wherein the substrate is impregnated, coated or combined into a composite stucture of unitary construction with a water-absorbent composition, the improvement which comprises the water-absorbent starch copolymerizate of claim 5.

24. The water-absorbent substrate according to claim 23 wherein the water-absorbent starch copolymerizate consists essentially of the copolymerization product of 100 parts by weight of acrylamide starch having a D.S. ranging from about 0.005 to about 0.1 and a D.E. ranging from about 0.25 to about 15, from about 100 to about 750 parts copolymerized ethylenically unsaturated monomer which contain "W" groups and from 0 to about 200 parts by weight of copolymerized ethylenically unsaturated monomers devoid of said "W" groups.

25. A copolymerizable starch-containing composition which can be converted into a water-absorbent starch copolymerizate having a plurality of starch chains linked together by polymeric linkages represented by the formula:

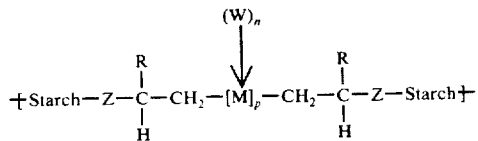

wherein Starch represents a starch chain of D-glucose units, Z represents an organo group which links the

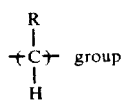 group to the carbon atom of the starch chain by a sulfur atom or an oxygen atom, R is a member selected from the group consisting of hydrogen and a monovalent organic radical, M represents a plurality of copolymerized ethylenically unsaturated monomers with "$p$" representing the number of copolymerized monomeric units in said linkage, (W) is a water-attractant group linked to the polymeric linkage and "$n$" represents the number of (W) moieties contained within the polymeric linkage of said copolymerized monomers with the number of (W) moieties being sufficient to impart water-absorbency properties to said copolymerizate, said copolymerizable composition comprising:

(a) starch chains containing appendant, terminal ethylenic unsaturated groups represented by the formula:

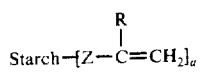

wherein Starch, Z and R are as defined above, and "$a$" represents the degree of substitution of said terminal unsaturated groups on said starch chain, and (b) ethylenically unsaturated monomers represented by the formula:

wherein M' represents an ethylenically unsaturated monomer, "(W')" represents at least one member selected from the group consisting of a water-attractant group or a precursor of a water-attractant group, and $n'$ is an integer.

26. The copolymerizable composition according to claim 25 wherein "Z" comprises an organo group represented by the formula:

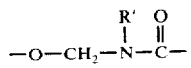

and R' is at least one member selected from the group consisting of hydrogen and a mono-organo group joined directly to the nitrogen atom by a monovalent bond, (W') is at least one water-attractant group or a precursor of a water-attractant group selected from the group of anion, cation, nonion, and zwitterion, and the copolymerizable starch composition contains 100 parts by weight of the ethylenically unsaturated starch having a D.S. from about 0.005 to about 0.10, from about 100 to about 750 parts by weight ethylenically unsaturated monomer which contains the "W'" group and from 0 to about 200 parts by weight ethylenically unsaturated monomers which are free of said "W'" groups.

27. The copolymerizate composition according to claim 26 wherein the starch chain consists essentially of an amylopectin hydrolyzate having a D.E. ranging from about 0.25 to about 10 and R represents at least one member selected from the group consisting of hydrogen and methyl.

28. In a method of absorbing water with a water-absorbent substance wherein a water-absorbent substance is placed into a medium which contains water and causing the water-absorbent substance to hydrate and absorb several times its dry weight in water, the improvement which comprises a water-absorbent starch copolymerizate which is capable of absorbing several times its own weight in water with said starch copolymerizate consisting essentially of the copolymerizate product of ethylenically unsaturated starch molecules and ethylenically unsaturated monomers with said ethylenically unsaturated monomers forming a connective polymeric linkage between said copolymerized starch molecules to provide a non-linear lattice of a plurality of starch chains linked together by polymeric linkages represented by the formula:

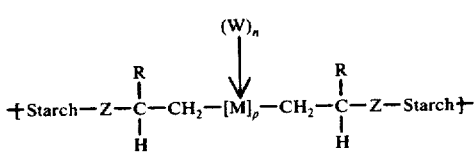

wherein Starch represents a starch chain of D-glucose units, Z represents an organo group which links the

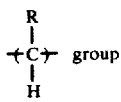

to the carbon atom of the starch chain by a sulfur atom or an oxygen atom, R is a member selected from the group consisting of hydrogen and a monovalent organic radical, M represents a plurality of copolymerized ethylenically unsaturated monomers with "p" representing the number of copolymerized monomeric units in said linkage, (W) is a water-attractant group linked to the polymeric linkage and "n" represents the number of (W) moieties contained within the polymeric linkage of said copolymerized monomers with the number of (W) moieties being sufficient to impart water-absorbency properties to said copolymerizate.

29. The improvement according to claim 28 wherein the Z organo group consists essentially of a

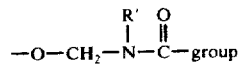

and R' is at least one member selected from the group consisting of hydrogen and a mono-organo group joined directly to the nitrogen atom by a monovalent bond, "W" is at least one member selected from the group consisting of anion, cation, nonion and zwitterion, the weight of copolymerized ethylenically unsaturated monomer in said copolymerizate ranges from about 10 to about 1000 parts by weight for each 100 parts by weight of copolymerized ethylenically unsaturated starch and from about 25 to about 100% of the copolymerized ethylenically unsaturated monomer contains the "W" substituent and "a" represents a degree of substitution ranging from about 0.003 to about 0.1.

30. The improvement according to claim 29 wherein the copolymerized unsaturated starch consists essentially of an acrylamide starch having a D.S. ranging from about 0.005 to about 0.05 and a D.E. ranging from about 0.25 to about 15, and the copolymerizate contains 100 parts by weight copolymerized ethylenically unsaturated starch hydrolyzate, from about 100 to about 750 parts copolymerized ethylenically unsaturated monomer which contain "W" groups and from 0 to about 200 parts by weight of copolymerized ethylenically unsaturated monomers free of said "W" groups.

31. The improvement according to claim 30 wherein the starch chain consists essentially of a amylopectin hydrolyzate having a D.E. of less than 10 and R represents a methyl group.

* * * * *